United States Patent
Yoshioka (10) Patent No.: US 9,039,981 B2
(45) Date of Patent: May 26, 2015

(54) EXHAUST GAS PURIFICATION APPARATUS OF AN INTERNAL COMBUSTION ENGINE

(75) Inventor: Mamoru Yoshioka, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 17 days.

(21) Appl. No.: 13/499,802

(22) PCT Filed: Mar. 10, 2011

(86) PCT No.: PCT/JP2011/055659
§ 371 (c)(1),
(2), (4) Date: Apr. 2, 2012

(87) PCT Pub. No.: WO2012/120680
PCT Pub. Date: Sep. 13, 2012

(65) Prior Publication Data
US 2013/0336847 A1   Dec. 19, 2013

(51) Int. Cl.
*F01N 3/10* (2006.01)
*B01D 53/94* (2006.01)
*F01N 3/20* (2006.01)
*F01N 3/28* (2006.01)

(52) U.S. Cl.
CPC .............. *B01D 53/94* (2013.01); *F01N 3/2026* (2013.01); *F01N 3/28* (2013.01); *F01N 2240/20* (2013.01); *Y02T 10/26* (2013.01); *F01N 3/2013* (2013.01); *F01N 3/2853* (2013.01)

(58) Field of Classification Search
USPC ..................................... 422/174; 60/275, 300
See application file for complete search history.

(56) References Cited

U.S. PATENT DOCUMENTS

| | | | |
|---|---|---|---|
| 5,094,074 A | 3/1992 | Nishizawa et al. | |
| 5,463,206 A | 10/1995 | Abe et al. | |
| 5,614,155 A | 3/1997 | Abe et al. | |
| 2012/0177541 A1 * | 7/2012 | Mutsuda et al. | 422/180 |

FOREIGN PATENT DOCUMENTS

| | | |
|---|---|---|
| JP | 4 171214 | 6/1992 |
| JP | 5 269387 | 10/1993 |
| JP | 5 96423 | 12/1993 |
| JP | 8 4521 | 1/1996 |

OTHER PUBLICATIONS

International Search Report Issued Jun. 7, 2011 in PCT/JP11/55659 Filed Mar. 10, 2011.

* cited by examiner

*Primary Examiner* — Walter D Griffin
*Assistant Examiner* — Jelitza Perez
(74) *Attorney, Agent, or Firm* — Oblon, McClelland, Maier & Neustadt, L.L.P.

(57) ABSTRACT

A laminated body composed of a holding member and an inner cylinder is arranged between a heat generation element, which is electrically energized to generate heat, and a case which covers the heat generation element, and the inner cylinder has an upstream side end portion extended to a more upstream side than an upstream side end face of said heat generation element and an upstream side end face of said holding member to form an extension portion, which is formed with a protruding portion protruding to an inner side in a diametrical direction. A flow of an exhaust gas, which flows backwards after colliding with the heat generation element, will be obstructed by said protruding portion. As a result, the backflow exhaust gas stops flowing into a gap between the case and the inner cylinder.

19 Claims, 10 Drawing Sheets

EXHAUST GAS PURIFICATION APPARATUS OF AN INTERNAL COMBUSTION ENGINE

TECHNICAL FIELD

The present invention relates to an electrically heated type exhaust gas purification apparatus which is arranged in an exhaust passage of an internal combustion engine and is heated by electrical energization thereof.

BACKGROUND ART

As an electrically heated type exhaust gas purification apparatus, there is known one which includes a catalyst carrier that is electrically energized to generate heat, a shell (case) that covers the catalyst carrier, and a fibrous mat member that is arranged between the catalyst carrier and the shell, wherein the mat member is provided with an insulating layer (see, for example, a first patent document).

PRIOR ART DOCUMENTS

Patent Documents

Patent Document 1: Japanese Patent Application Laid-Open No. 05-269387

DISCLOSURE OF THE INVENTION

Problem to be Solved by the Invention

However, when carbon in an exhaust gas adheres to the mat member, or when condensed water accumulated or stayed in the exhaust passage or the case (shell) adheres to an end face of the mat member or permeates into the mat member, the shell and the catalyst carrier may be short-circuited.

The present invention has been made in view of the above-described actual situation, and its object is to provide a technique which is capable of preventing a short-circuit between a heat generation element, which is electrically energized to generate heat, and a case in an electrically heated type exhaust gas purification apparatus.

Means for Solving the Problem

In order to solve the above-mentioned problem, the present invention is constructed such that a laminated body composed of a holding member and an inner cylinder is arranged between a heat generation element, which is electrically energized to generate heat, and a case which covers the heat generation element, and the inner cylinder has an upstream side end portion extended to a location upstream of an upstream side end face of said heat generation element and an upstream side end face of said holding member to form an extension portion, which is formed with a protruding portion protruding to an inner side in a diametrical direction.

Specifically, an exhaust gas purification apparatus of an internal combustion engine according to the present invention is constructed to be provided with:

a heat generation element that is electrically energized to generate heat;

a case that is a cylindrical member having an inside diameter larger than an outside diameter of said heat generation element, and covers said heat generation element;

an inner cylinder that is a cylindrical insulating body having an inside diameter larger than the outside diameter of said heat generation element and at the same time an outside diameter smaller than the inside diameter of said case, and is arranged between said heat generation element and said case;

a first holding member that is a cylindrical insulating body arranged between said case and said inner cylinder, and holds said inner cylinder;

a second holding member that is a cylindrical insulating body arranged between said heat generation element and said inner cylinder, and holds said heat generation element;

an extension portion that is formed by extending an upstream side end portion of said inner cylinder to a more upstream side than an upstream side end face of said first holding member and an upstream side end face of said second holding member; and a protruding portion that is formed on said extension portion and protrudes to a diametrically inner side of said inner cylinder.

The heat generation element referred to herein may also be used as a catalyst carrier, or may be arranged upstream of a catalyst carrier. The first holding member and the second holding member are each a cylindrical member having insulation and shock-absorbing or cushioning properties, and for these members, there can be used, for example, a fibrous metal (e.g., alumina fiber mat) having an electrically insulating property which has been molded into a cylindrical shape. Here, note that the cylindrical shape referred to herein should not be limited to a shape in which a sectional shape is a perfect circle, but may also include a shape in which a sectional shape is an ellipse.

According to the exhaust gas purification apparatus of an internal combustion engine as constructed in this manner, a member for holding the heat generation element with respect to the case is separated into the first holding member and the second holding member by means of the inner cylinder, so even if the condensed water accumulated or stayed on an inner peripheral surface of the case adheres to the end face of the first holding member or permeates into the first holding member, the condensed water becomes unable to travel to the heat generation element through the second holding member. As a result, there will not arise a situation in which the case and the heat generation element are short-circuited to each other through the condensed water.

However, when the surfaces of the inner cylinder (an outer peripheral surface and an inner peripheral surface of the extension portion), the upstream side end face of the first holding member, and the upstream side end face of the second holding member are covered with particulate matter (PM) in an exhaust gas, the case and the heat generation element can be short-circuited to each other through the particulate matter. As a method for solving this problem, it is effective to adopt a method of decreasing the amount of particulate matter adhering to the outer peripheral surface of the extension portion or the upstream side end face of the first holding member, and at the same time quickly oxidizing the particulate matter adhered to the outer peripheral surface of said extension portion.

As a method to decrease the amount of particulate matter adhering to the outer peripheral surface of the extension portion or the upstream side end face of the first holding member, it is effective to adopt a method of decreasing the amount of exhaust gas flowing into a gap formed between the inner cylinder and the case at a location upstream of the upstream side end face of the first holding member (specifically, a space which is surrounded by the outer peripheral surface of the inner cylinder, the upstream side end face of the first holding member, and the inner peripheral surface of the case, and which is hereinafter referred to as an "upstream side gap").

According to the knowledge of the inventor of the present application, the amount of the exhaust gas flowing into the upstream side gap increases at the time when the exhaust gas flowing backwards after colliding with the heat generation element (hereinafter referred to as "the backflow exhaust gas") reaches a location upstream of the upstream side end portion of the extension portion. This is considered that when the exhaust gas having collided with the heat generation element flows backwards to a location upstream of the upstream side end portion of the extension portion, the backflow exhaust gas is caused to move to the vicinity of a periphery inside the case under the action of the pressure of the following exhaust gas (the exhaust gas which flows into the case from the upstream side thereof), so that it flows into said upstream side gap.

In contrast to this, the exhaust gas purification apparatus of an internal combustion engine according to the present invention is provided with the protruding portion that protrudes from the extension portion to the diametrically inner side of the inner cylinder, so the flow of said backflow exhaust gas becomes obstructed by the protruding portion. As a result, said backflow exhaust gas becomes unable to reach a location upstream of the upstream side end portion of the extension portion. Therefore, the amount of the exhaust gas flowing into the upstream side gap can be decreased. When the amount of the exhaust gas flowing into the upstream side gap becomes small, the amount of the particulate matter adhering to the outer peripheral surface of the extension portion and/or the upstream side end face of the first holding member will decrease. In addition, when the amount of the exhaust gas flowing into the upstream side gap becomes small, the amount of heat to be released from the exhaust gas into the atmospheric air through the case will also decrease, so a drop in the temperature of the catalyst and a reduction in the warm-up capability thereof are also suppressed.

As a method for quickly oxidizing the particulate matter adhered to the outer peripheral surface of the extension portion, it is effective to adopt a method of raising the temperature of the inner cylinder. On the other hand, the exhaust gas purification apparatus of an internal combustion engine of the present application has the protruding portion formed on the extension portion, as mentioned above, so it is possible to increase a contact area or contact time between the exhaust gas and the inner cylinder. As the contact area or contact time between the exhaust gas and the inner cylinder increases, the amount of heat to be transmitted from the exhaust gas to the inner cylinder increases. As a result, the temperature of the inner cylinder can be increased. Therefore, the particulate matter adhered to the outer peripheral surface of the extension portion can be oxidized in a quick manner, and at the same time, the condensed water existing on the inner peripheral surface of the case can be vaporized in a quick manner.

The protruding portion according to the present invention may be formed such that the upstream side end portion of the extension portion is bent to the diametrically inner side thereof. In that case, a contact area or contact time between the backflow exhaust gas and the inner cylinder increases in comparison with the case where the protruding portion is formed on the middle of the extension portion (a portion of the extension portion nearer to the downstream side end thereof than to the upstream side end portion thereof), so the temperature of the inner cylinder goes up much more easily. As a result, it becomes much easier for the particulate matter adhered to the outer peripheral surface of the inner cylinder to be oxidized, and at the same time, it also becomes much easier for the condensed water existing on the inner peripheral surface of the case to be vaporized.

Here, note that said protruding portion may curve in such a manner that a tip of said protruding portion is directed to a downstream side. According to such a construction, it becomes the backflow exhaust gas becomes such that it flows in a forward direction after colliding with the protruding portion. As a result, the backflow exhaust gas reaching a location upstream of the upstream side end portion of the extension portion further decreases.

In addition, a curved portion of said protruding portion has a curvature, the magnitude of which is set in such a manner that the exhaust gas flowing backwards along an inner wall surface of said inner cylinder swirls in a forward direction along an inner wall surface of the protruding portion. In that case, the backflow exhaust gas is made to swirl in the forward direction, without disturbing the flow of the exhaust gas inside the case. Moreover, the contact area or contact time between the exhaust gas and the inner cylinder can be made much larger. Therefore, the amount of rise in the temperature of the inner cylinder can be made to increase, without causing a pressure loss of the exhaust gas purification apparatus to increase unnecessarily.

Here, as the case of the exhaust gas purification apparatus, there is widely known one which is provided with a cylindrical portion, and a conical portion of a tapered shape that is connected with an upstream side end portion and a downstream side end portion of the cylindrical portion. The exhaust gas, which has flowed into such a case, has a tendency to flow to a downstream side, while spreading to a diametrically outer side in an upstream side conical portion. For that reason, there is a possibility that a part of the exhaust gas having spreading to the diametrically outer side in the upstream side conical portion (e.g., the exhaust gas flowing through the vicinity of a periphery inside of the case) may flow into the upstream side gap.

In contrast to this, the exhaust gas purification apparatus of an internal combustion engine of the present invention may be further provided with a restriction member that is an annular body protruding from an inner wall surface of an upstream side conical portion to a downstream side thereof, and has an inside diameter equal to or less than that of said inner cylinder. Here, note that the restriction member has an axial center which should be located on the same straight line as an axial center of the inner cylinder. According to such a restriction member, it becomes difficult for the exhaust gas to spread to an outer side from said inner cylinder (to a diametrically outer side) in the upstream side conical portion. As a result, it becomes difficult for the exhaust gas having flowed into the upstream side conical portion to flow into the upstream side gap. Therefore, the amount of particulate matter adhering to the outer peripheral surface of the inner cylinder or the upstream side end face of the first holding member can be further decreased, and at the same time, the amount of heat to be released from the exhaust gas into the atmospheric air through an outer case can be further decreased.

On the other hand, when the exhaust gas pressure inside the case becomes high due to an increase in the flow rate of the exhaust gas, etc., a part of the exhaust gas can be pushed into the upstream side gap. However, according to the exhaust gas purification apparatus provided with the restriction member as mentioned above, a space surrounded by an outer peripheral surface of the restriction member and an inner wall surface of the upstream side conical portion functions as a volume chamber (surge tank) for causing the exhaust gas to stay therein temporarily. For that reason, even in cases where the exhaust gas pressure inside the case becomes high, the amount of the exhaust gas flowing into a gap between the inner cylinder and the case can be suppressed to be small.

Moreover, an auxiliary protruding portion diagonally protruding to the diametrically outer side and the upstream side of the inner cylinder may be formed on the middle of said protruding portion. In that case, a flow of the exhaust gas, which is going to flow into the upstream side gap, is interrupted or shielded by the auxiliary protruding portion, so that it comes to be introduced to said volume chamber. As a result, the amount of the exhaust gas flowing into the upstream side gap can be made further smaller.

However, in cases where as the case of the exhaust gas purification apparatus, there is used one in which conical portions are connected with each end of a cylindrical portion, a portion of the exhaust gas, which has flowed out of the heat generation element and flows through the vicinity of the periphery of the case (the vicinity of the periphery of the cylindrical portion), can flow backwards, after colliding with an inner wall surface of a downstream side conical portion. There will be a possibility that the exhaust gas flowing backwards in this manner may flow into a gap formed between the inner cylinder and the case at a location downstream of a downstream side end face of the first holding member (specifically, a space which is surrounded by the outer peripheral surface of the inner cylinder, the downstream side end face of the first holding member, and the inner peripheral surface of the case, and which is hereinafter referred to as a "downstream side gap"). When the exhaust gas flows into the downstream side gap, there will be a fear that the outer peripheral surface of the inner cylinder and the downstream side end face of the first holding member may be covered with particulate matter, so that a short-circuit between the case and the heat generation element can be induced.

Accordingly, the exhaust gas purification apparatus of an internal combustion engine of the present invention may be provided with a shield part that is formed on the inner peripheral surface of said case at a location downstream of a downstream side end portion of said inner cylinder, and protrudes to a diametrically inner side of said case. According to such a construction, a flow of the exhaust gas flowing backwards from the downstream side conical portion to an upstream side thereof will be obstructed by said shield part. As a result, the exhaust gas flowing into said downstream side gap decreases. Therefore, the amount of particulate matter adhering to the outer peripheral surface of the inner cylinder, the downstream side end face of the first holding member and the inner peripheral surface of the case can be decreased. Here, note that the shape of the shield part may be formed into a shape in which the backflow exhaust gas swirls in the forward direction along a wall surface of the shield part, similar to the above-mentioned protruding portion.

Here, note that in the above-mentioned various constructions, when the shortest distance between the outer peripheral surface of the extension portion and the inner peripheral surface of the case, or the shortest distance between the inner cylinder (including the extension portion and the protruding portion) and the restriction member, or the shortest distance between the inner cylinder and the shield part, becomes short, there will be a possibility that a discharge phenomenon may occur therebetween. When a discharge phenomenon occurs between the outer peripheral surface of the extension portion and the inner peripheral surface of the case, or between the inner cylinder and the restriction member, or between the inner cylinder and the shield part, there will also be a possibility that the case and the heat generation element may be short-circuited to each other. Accordingly, it is preferable that the shortest distance between the outer peripheral surface of the extension portion of the inner cylinder and the inner peripheral surface of the case, the shortest distance between the inner cylinder and the restriction member, and the shortest distance between the inner cylinder and the shield part, be set equal to or larger than a spatial distance at which a discharge phenomenon does not occur.

Further, when the distance or length of the extension portion becomes short, there will also be a possibility that a creeping discharge may occur between the first holding member and the second holding member along the surface of the extension portion. That is, a creeping distance of the extension portion extending from the upstream side end face of the first holding member to the upstream side end face of the second holding member becomes short, a creeping discharge can occur between the first holding member and the second holding member. Accordingly, it is preferable that the creeping distance of the extension portion extending from the upstream side end face of said first holding member to the upstream side end face of the second holding member be set to be equal to or larger than a distance at which a creeping discharge does not occur between the first holding member and the second holding member. Here, note that a creeping discharge through the inner cylinder can also occur even between the downstream side end face of the first holding member and a downstream side end face of the second holding member. Therefore, the downstream side end portion of the inner cylinder may also be extended to a location downstream of the downstream side end faces of the first holding member and the second holding member, and the creeping distance of the thus extended portion may be set to be equal to or larger than a distance at which a creeping discharge does not occur between the downstream side end face of the first holding member and the downstream side end face of the second holding member.

When the relative positions or dimensions of the individual parts or members are set in the above-mentioned manner, it is possible to prevent a short-circuit between the case and the heat generation element in a more reliable manner.

Effects of the Invention

According to the present invention, it is possible to prevent a short-circuit between a heat generation element, which is electrically energized to generate heat, and a case in an electrically heated type exhaust gas purification apparatus.

MODES FOR CARRYING OUT THE INVENTION

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

First Embodiment

Figure 1:
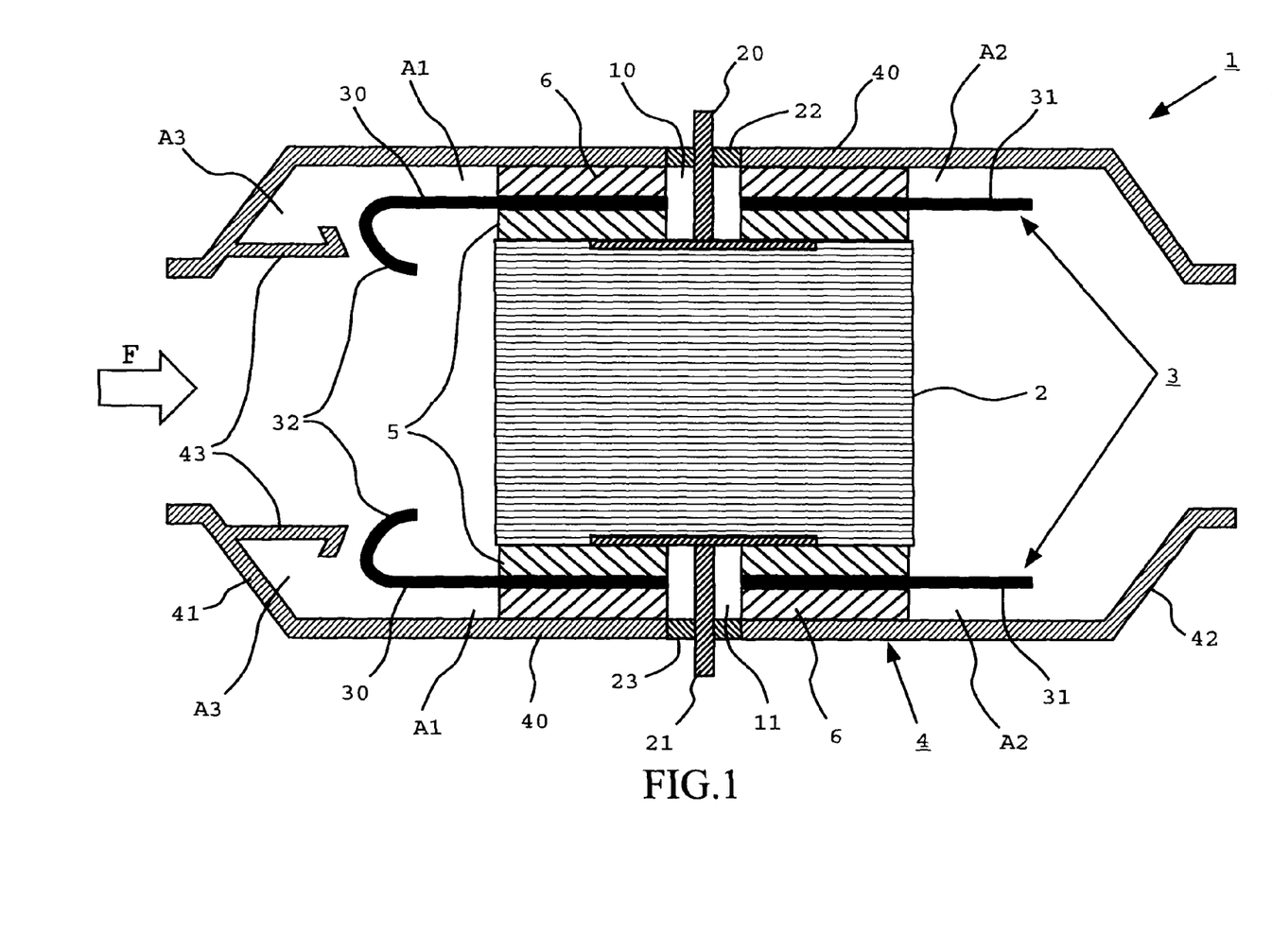
FIG. 1 is a view showing a vertical cross section of an exhaust gas purification apparatus in a first embodiment of the present invention.
Figure 2:
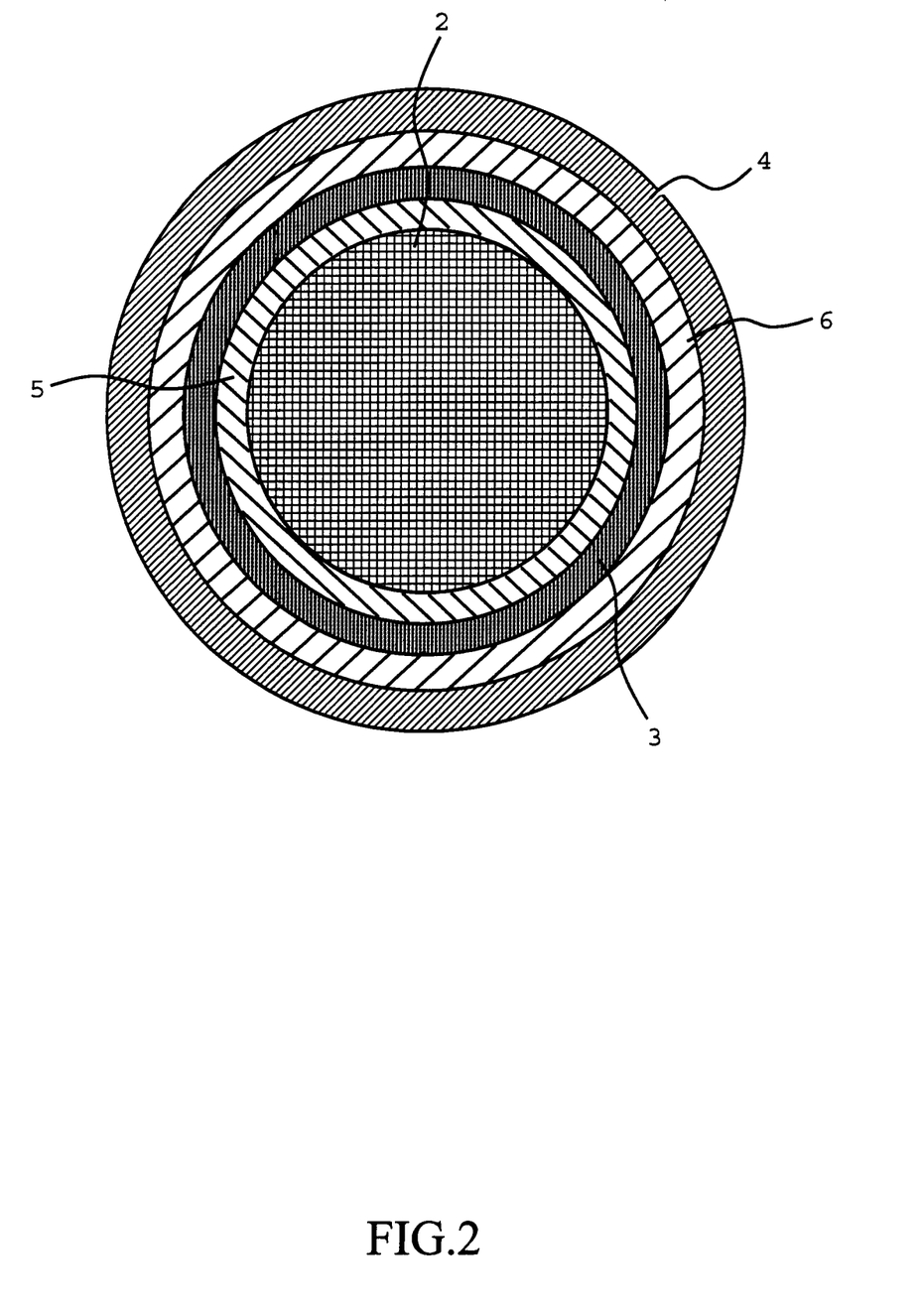
FIG. 2 is a view showing a transverse or horizontal cross section of the exhaust gas purification apparatus in the first embodiment of the present invention.

First, reference will be made to a first embodiment of the present invention based on FIGS. 1 through 7. FIGS. 1 and 2 are views showing the schematic construction of an exhaust gas purification apparatus of an internal combustion engine according to this first embodiment of the present invention. The exhaust gas purification apparatus 1 shown in FIGS. 1 and 2 is an electrically heated type exhaust gas purification apparatus which is arranged in an exhaust passage of the internal combustion engine. Here, note that an arrow F in FIG. 1 indicates the direction of a flow of an exhaust gas.

The exhaust gas purification apparatus 1 is provided with a catalyst carrier 2 that is formed into a cylindrical shape, a tubular inner cylinder 3 that serves to cover the catalyst carrier 2, and a case 4 that serves to cover the inner cylinder 3. The catalyst carrier 2, the inner cylinder 3 and the case 4 are arranged in alignment with one another.

The above-mentioned catalyst carrier 2 is a structural member in which a plurality of passages extending in the direction of flow F of the exhaust gas are arranged in a honeycomb shape, wherein the structural member has an outer shape formed into a cylindrical shape. On the catalyst carrier 2, there is carried or supported an oxidation catalyst, a three-way catalyst, an $NO_x$ storage reduction catalyst, an $NO_x$ selective reduction catalyst, or the like. Here, note that the catalyst carrier 2 is formed of a material having a large electric resistance such as porous ceramics (SiC).

The above-mentioned inner cylinder 3 is formed by molding into a cylindrical or tubular shape an electrically insulating material which is low in electric conductivity and high in heat resistance (e.g., alumina, a stainless steel material with its surface coated with an electrically insulating layer, etc.). The inner cylinder 3 is formed in such a manner that an inside diameter of the inner cylinder 3 becomes larger than an outside diameter of the catalyst carrier 2.

A cylindrical mat member 5 is press fitted into between an inner peripheral surface of the above-mentioned inner cylinder 3, and an outer peripheral surface of the catalyst carrier 2. The mat member 5 is formed of an insulating material which is low in electrical conductivity and high in shock-absorbing or cushioning property (e.g., an inorganic fiber mat such as an alumina fiber mat or the like). The mat member 5 is formed such that the length in the axial direction (the length in the direction of flow of the exhaust gas F) of the mat member 5 is substantially equal to that of the catalyst carrier 2. The mat member 5 is arranged in such a manner that the positions of the opposite end faces of the mat member 5 in the axial direction thereof become substantially equal to the positions of the opposite end faces of the catalyst carrier 2.

The above-mentioned case 4 is a housing made of metal (e.g., a stainless steel material) which covers the above-mentioned catalyst carrier 2 and the above-mentioned inner cylinder 3. The case 4 is provided with a cylindrical portion 40 that has an inside diameter larger than an outside diameter of the inner cylinder 3, an upstream side conical portion 41 that is connected with an upstream side end portion of the cylindrical portion 40, and a downstream side conical portion 42 that is connected with a downstream side end portion of the cylindrical portion 40. The upstream side conical portion 41 and the downstream side conical portion 42 are each formed into a tapered shape in which an inside diameter thereof becomes smaller in accordance with an increasing separation or distance thereof from the cylindrical portion 40.

A cylindrical mat member 6 is press fitted into between the inner peripheral surface of the above-mentioned cylindrical portion 40, and an outer peripheral surface of the above-mentioned inner cylinder 3. The mat member 6 is formed of an electrically insulating material which is low in electrical conductivity and high in shock-absorbing or cushioning property, similar to the above-mentioned mat member 5. The mat member 6 is formed such that the length in the axial direction of the mat member 6 is substantially equal to that of the catalyst carrier 2. The mat member 6 is arranged in such a manner that the positions of the opposite end faces of the mat member 6 in the axial direction thereof become substantial Here, note that the above-mentioned mat member 6 corresponds to a first holding member according to the present invention, and the above-mentioned mat member 5 corresponds to a second holding member according to the present invention. Hereinafter, the mat member 6 is referred to as a first mat member 6, and the mat member 5 is referred to as a second mat member 5.

In addition, a pair of through holes 10, 11, which extend through the case 4, the first mat member 6, the inner cylinder 3 and the second mat member 5, are formed at two mutually opposing locations, respectively, in the outer peripheral surface of the exhaust gas purification apparatus 1. A pair of the electrodes 20, 21 are arranged at two locations in the outer peripheral surface of the catalyst carrier 2 which face the above-mentioned through holes 10, 11, respectively. The electrodes 20, 21 have terminals which pass through the through holes 10, 11, respectively, so as to protrude to the outside of the case 4. The protruded portions (terminals) of the electrodes 20, 21 are connected to an unillustrated battery.

Support members 22, 23, which serve to support the electrodes 20, 21, respectively, are arranged in the vicinities of the through holes 10, 11 in the above-mentioned case 4. The support members 22, 23 are formed in such a manner so as to cover annular opening portions between the case 4 and the electrodes 20, 21, respectively. Here, note that the support members 22, 23 should be formed of an electrically insulating material which is low in electric conductivity and high in breathability.

According to the exhaust gas purification apparatus 1 constructed in this manner, when a voltage is applied to the electrodes 20, 21 from the battery, the catalyst carrier 2 serves as electric resistance to generate heat. When the catalyst carrier 2 generates heat, the temperature of a catalyst carried or supported by the catalyst carrier 2 goes up. For that reason, in cases such as when the internal combustion engine is cold started, if a voltage is applied to the electrodes 20, 21 from the battery, it is possible to activate the catalyst at an early stage, thus making it possible to achieve a decrease in exhaust emissions.

However, moisture is contained in the exhaust gas of the internal combustion engine, so during the time when the internal combustion engine is stopped, the moisture may condense to accumulate in the exhaust passage or in the exhaust gas purification apparatus 1. The condensed water receives the pressure of the exhaust gas during the operation of the internal combustion engine, so that it is thereby caused to move to a downstream side. The condensed water which has flowed into the exhaust gas purification apparatus 1 from the exhaust passage, or the condensed water which has been accumulated in the exhaust gas purification apparatus 1, is caused to move to the downstream side while transmitting on the inner peripheral surface of the case 4. When such condensed water reaches an upstream side end face of the first mat member 6, it may be transmitted from the upstream side end face of the first mat member 6 to the surface of the catalyst carrier 2 through an upstream side end face of the second mat member 5. In such a case, when a voltage is applied to the electrodes 20, 21 from the battery, there will be a fear that the case 4 and the catalyst carrier 2 may be short-circuited to each other.

In contrast to this, in the exhaust gas purification apparatus 1 of this embodiment, the length in the axial direction of the inner cylinder 3 is made longer than those of the first mat member 6 and the second mat member 5, and at the same time, the opposite end portions of the inner cylinder 3 are made to protrude to a more upstream side and a more downstream side than the first mat member 6 and the second mat member 5, respectively. Hereinafter, an upstream side protruding portion 30 in the inner cylinder 3 (a portion located at a more upstream side than the upstream side end faces of the first mat member 6 and the second mat member 5) is referred to as an upstream side extension portion 30, and a downstream side protruding portion 31 of the inner cylinder 3 (a portion located at a more downstream side than the downstream side end faces of the first mat member 6 and the second mat member 5) is referred to as a downstream side extension portion 31.

When the inner cylinder 3 is formed and arranged in the manner as mentioned above, the condensed water adhered to the upstream side end face of the first mat member 6 becomes unable to be transmitted to the upstream side end face of the second mat member 5. As a result, it is possible to prevent a short-circuit between the case 4 and the catalyst carrier 2 resulting from the condensed water.

In addition, although most of the exhaust gas having flowed into the case 4 flows into the catalyst carrier 2 along the direction of flow F of the exhaust gas, a part of the exhaust gas may reflect on the upstream side end face of the catalyst carrier 2 and flow backwards. For example, although the exhaust gas flowing through the vicinity of the center inside the case 4 is liable to flow into the catalyst carrier 2, the exhaust gas flowing through the vicinity of the periphery inside the case 4 is liable to flow backwards after colliding with the upstream side end face of the catalyst carrier 2.

The exhaust gas (backflow exhaust gas) flowing backwards after colliding with the upstream side end face of the catalyst carrier 2 may flow to the upstream side along an inner wall surface of the inner cylinder 3 (an inner wall surface of the upstream side extension portion 30), so that it may reach a more upstream side than the upstream side end portion of the inner cylinder 3. In that case, the backflow exhaust gas is liable to be pushed, due to the pressure of the following exhaust gas, into a space (upstream side gap) A1 which is surrounded by an outer peripheral surface of the upstream side extension portion 30, the inner peripheral surface of the case 4, and the upstream side end face of the first mat member 6. As a result, there is a possibility that a large amount of exhaust gas may flow into the upstream side gap A1.

When the large amount of exhaust gas flows into the upstream side gap A1, the wall surfaces (the inner peripheral surface of the case 4, the upstream side end face of the first mat member 6, and the outer peripheral surface of the upstream side extension portion 30) surrounding this upstream side gap A1 may be covered with particulate matter. In that case, if the inner peripheral surface of the upstream side extension portion 30 and the upstream side end face of the second mat member 5 are covered with particulate matter, there will be a fear that the case 4 and the catalyst carrier 2 may be short-circuited to each other through the particulate matter.

In addition, when a large amount of exhaust gas flows into the upstream side gap A1, the amount of heat released from the exhaust gas into the atmospheric air through the wall surface of the case 4 will increase. In that case, because the temperature of the exhaust gas flowing into the catalyst carrier 2 (hereinafter referred to as an "inflow temperature") decreases, the amount of heat transmitted from the exhaust gas to the catalyst carrier 2 decreases, or the amount of heat transmitted from the catalyst carrier 2 to the exhaust gas increases. As a result, there will be a possibility that the time of activation of the catalyst may become late, or the electric power consumption of the battery may become large.

In contrast to this, the exhaust gas purification apparatus 1 of this embodiment is provided with a protruding portion 32 that protrudes from the upstream side extension portion 30 to a diametrically inner side thereof. When such a protruding portion 32 is formed on the upstream side extension portion 30, the flow of the backflow exhaust gas becomes obstructed by the protruding portion 32. As a result, it becomes more difficult for the backflow exhaust gas to reach upstream of the upstream side end portion of the upstream side extension portion 30, and the amount of the exhaust gas flowing into the upstream side gap A1 decreases. Therefore, it is possible to suppress the amount of particulate matter adhering to the inner peripheral surface of the case 4, the upstream side end face of the first mat member 6, and the outer peripheral surface of the upstream side extension portion 30 to a small value, and at the same time to suppress the drop of the inflow temperature.

In addition, the contact area and contact time of the inner cylinder 3 and the exhaust gas increase due to the contact of the backflow exhaust gas with the protruding portion 32. As a result, the amount and rate of temperature rise of the inner cylinder 3 increase. Therefore, even if a small amount of particulate matter adheres to the outer peripheral surface of the upstream side extension portion 30, the particulate matter thus adhered can be oxidized and removed in a quick manner. Moreover, when the amount and rate of temperature rise of the inner cylinder 3 increase, it will also become possible to cause the condensed water existing in the upstream side gap A1 to vaporize quickly.

Here, note that the protruding portion 32 may curve gently so that a tip of this protruding portion 32 is directed to the downstream side. At that time, the curvature of the protruding portion 32 should be set to such a magnitude that the backflow exhaust gas flowing along the inner wall surface of the upstream side extension portion 30, when reaches the protruding portion 32, is able to continue to flow without exfoliating from the inner wall surface of the protruding portion 32.

Figure 3:
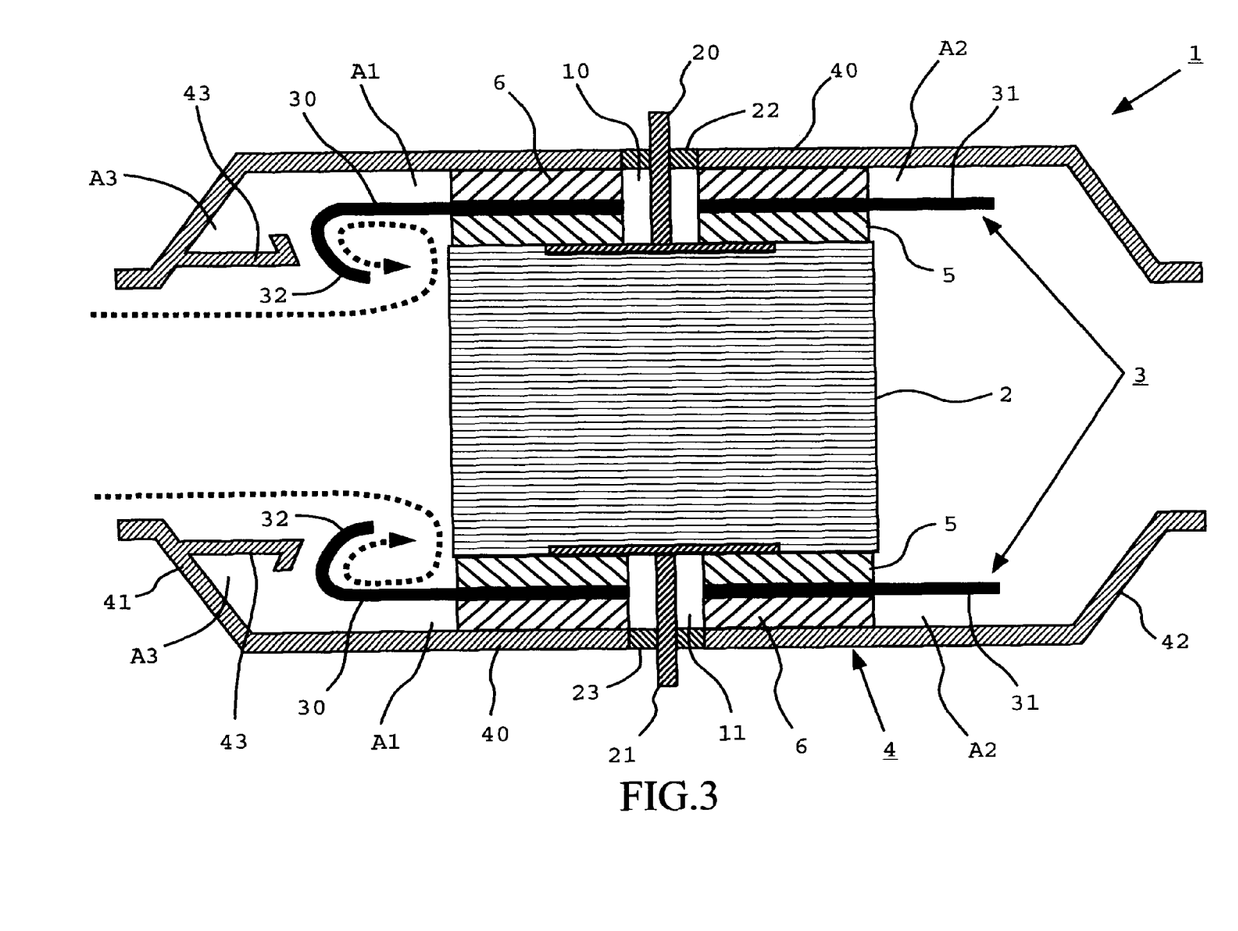
FIG. 3 is a view showing a flow of an exhaust gas which flows backwards or upstream after colliding with a catalyst carrier.

In cases where the protruding portion 32 is formed in this manner, the backflow exhaust gas swirls along the shape of the protruding portion 32, as shown by a broken line arrow in FIG. 3. That is, the backflow exhaust gas swirls from a reverse flow or backflow direction to a forward flow direction while being guided by the protruding portion 32. As a result, the backflow exhaust gas stops flowing into the upstream side gap A1. Therefore, it is possible to decrease the amount of particulate matter adhering to the inner peripheral surface of the case 4, the upstream side end face of the first mat member 6, and the outer peripheral surface of the upstream side extension portion 30 in a reliable manner, and at the same time to suppress the drop of the inflow temperature in a reliable manner.

Figure 4:
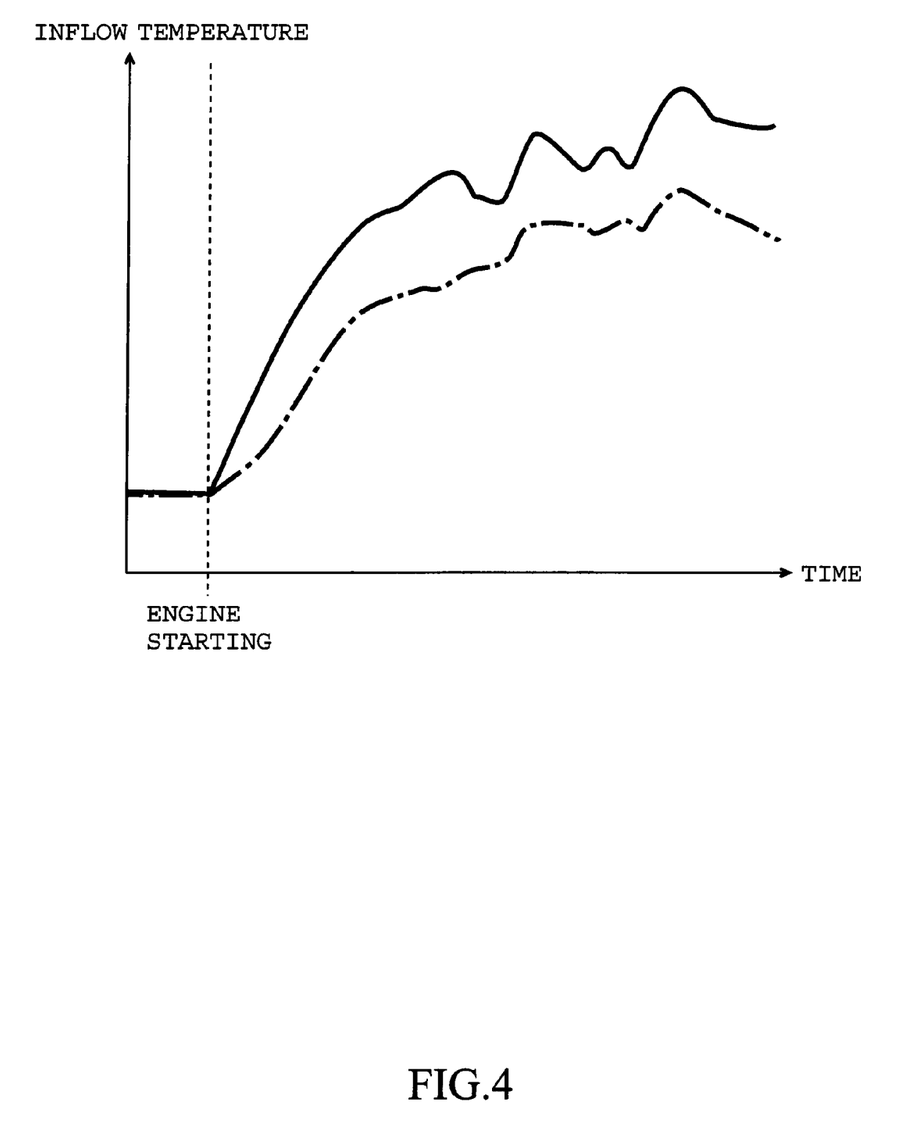
FIG. 4 is a view showing the relation between the time elapsed from the starting of an internal combustion engine and the temperature (inflow temperature) of the exhaust gas which flows into the catalyst carrier.

Here, the change of the inflow temperature in the case where the protruding portion 32 is formed on the upstream side extension portion 30, and the change of the inflow temperature in the case where the protruding portion 32 is not formed on the upstream side extension portion 30 are shown in FIG. 4. The axis of abscissa in FIG. 4 represents the time elapsed from the starting of the internal combustion engine, and the axis of ordinate represents the inflow temperature. In addition, a solid line in FIG. 4 indicates the inflow temperature in the case where the protruding portion 32 is formed on the upstream side extension portion 30, and an alternate long and short dash line indicates the inflow temperature in the case where the protruding portion 32 is not formed on the upstream side extension portion 30.

As shown in FIG. 4, in the case where the protruding portion 32 is formed on the upstream side extension portion 30, the rate of rise of the inflow temperature becomes higher, and at the same time the amount of temperature rise of the inflow temperature becomes larger, as compared with the case where the protruding portion 32 is not formed. Therefore, in the case where the protruding portion 32 is formed on the upstream side extension portion 30, the time of activation of the catalyst can be made earlier, and at the same time, the electric power consumption of the battery can be made smaller, in comparison with the case where the protruding portion 32 is not formed.

In addition, when the backflow exhaust gas comes to flow along the inner wall surfaces of the upstream side extension portion 30 and the protruding portion 32, the contact area and contact time of the exhaust gas and the inner cylinder 3 will further increase. As a result, the amount and rate of temperature rise of the inner cylinder 3 will also further increase. Therefore, the particulate matter adhered to the outer peripheral surface of the upstream side extension portion 30 can be oxidized and removed in a more reliable manner, and at the same time, the condensed water existing in the upstream side gap A1 can be vaporized and removed in a more reliable manner.

However, the exhaust gas, which has flowed into the case 4, has a tendency to flow to the downstream side, while spreading to a diametrically outer side in the upstream side conical portion 41. For that reason, there is a possibility that a part of the exhaust gas having spreading to the diametrically outer side in the upstream side conical portion 41 (e.g., exhaust gas flowing through the vicinity of the periphery inside of the case 4) may flow into the upstream side gap A1.

On the other hand, the exhaust gas purification apparatus 1 of this embodiment is provided with an annular restriction member 43 that protrudes from an inner wall surface of the upstream side conical portion 41 to the downstream side thereof. The restriction member 43 is formed so as to have an inside diameter equal to or less than the outside diameter of the inner cylinder 3, and is arranged in such a manner that an axial center of the restriction member 43 is located on the same straight line as the axial center of the inner cylinder 3. That is, the restriction member 43 is constructed so that the position thereof in the diametrical direction thereof becomes inside (nearer to the center than) of the outer peripheral surface of the inner cylinder 3.

According to such a restriction member 43, it becomes difficult for the exhaust gas having flowed into the case 4 to spread to the outer side of the inner cylinder 3 (to the diametrically outer side) in the upstream side conical portion 41. As a result, it becomes difficult for the exhaust gas flowing through the vicinity of the periphery inside of the case 4 to flow into the upstream side gap A1. In addition, because a gap (effective opening area) between the restriction member 43 and the protruding portion 32 becomes narrow, it becomes much more difficult for the exhaust gas flowing through the vicinity of the periphery inside of the case 4 to flow into the upstream side gap A1. Therefore, the amount of the exhaust gas flowing into the upstream side gap A1 can be made further smaller.

Here, note that when the exhaust gas pressure inside the case 4 becomes high due to an increase in the flow rate of the exhaust gas, etc., a part of the exhaust gas can be pushed into the upstream side gap A1. On the other hand, according to the exhaust gas purification apparatus 1 provided with the restriction member 43 as mentioned above, a space A3 surrounded by an outer peripheral surface of the restriction member 43 and an inner peripheral surface of the upstream side conical portion 41 functions as a volume chamber (surge tank) for causing the exhaust gas to stay therein temporarily. For that reason, even in cases where the exhaust gas pressure inside the case 4 becomes high, the amount of the exhaust gas flowing into the upstream side gap A1 can be suppressed to be small.

Figure 5:
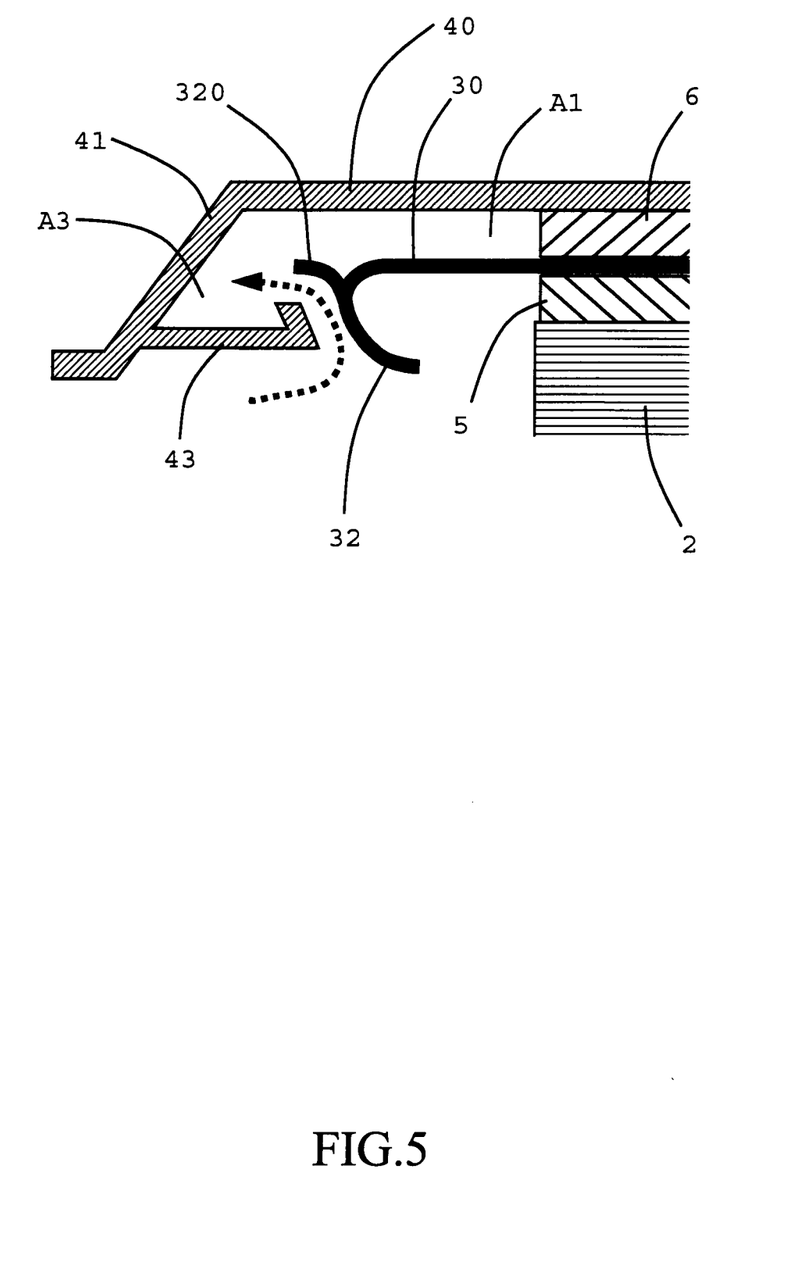
FIG. 5 is a view showing a construction example in which an auxiliary protruding portion is formed on a protruding portion.

Here, in the middle of the protruding portion 32, there may be formed an auxiliary protruding portion 320 protruding diagonally toward the diametrically outer side and the upstream side, as shown in FIG. 5. According to such an auxiliary protruding portion 320, the exhaust gas flowing into the gap between the restriction member 43 and the protruding portion 32 becomes difficult to flow into the upstream side gap A1, and easy to flow into the above-mentioned volume chamber A3. As a result, the amount of the exhaust gas flowing into the upstream side gap A1 becomes extremely small.

According to the exhaust gas purification apparatus 1 as described above, it is possible to avoid a situation where the wall surfaces (the inner peripheral surface of the case 4, the upstream side end face of the first mat member 6, and the outer peripheral surface of the upstream side extension portion 30) surrounding the upstream side gap A1 is covered with particulate matter, and at the same time, it is also possible to suppress a drop in the temperature of the exhaust gas flowing into the catalyst carrier 2. Moreover, according to the exhaust gas purification apparatus 1 of this embodiment, the temperature of the inner cylinder 3 (the upstream side extension portion 30) can be made higher, so the particulate matter adhered to the outer peripheral surface of the upstream side extension portion 30 and the condensed water existing in the upstream side gap A1 can be removed in a quick manner. As a result, it becomes possible to activate the catalyst in an efficient manner, while suppressing the short-circuit of the case 4 and the catalyst carrier 2.

Figure 6:
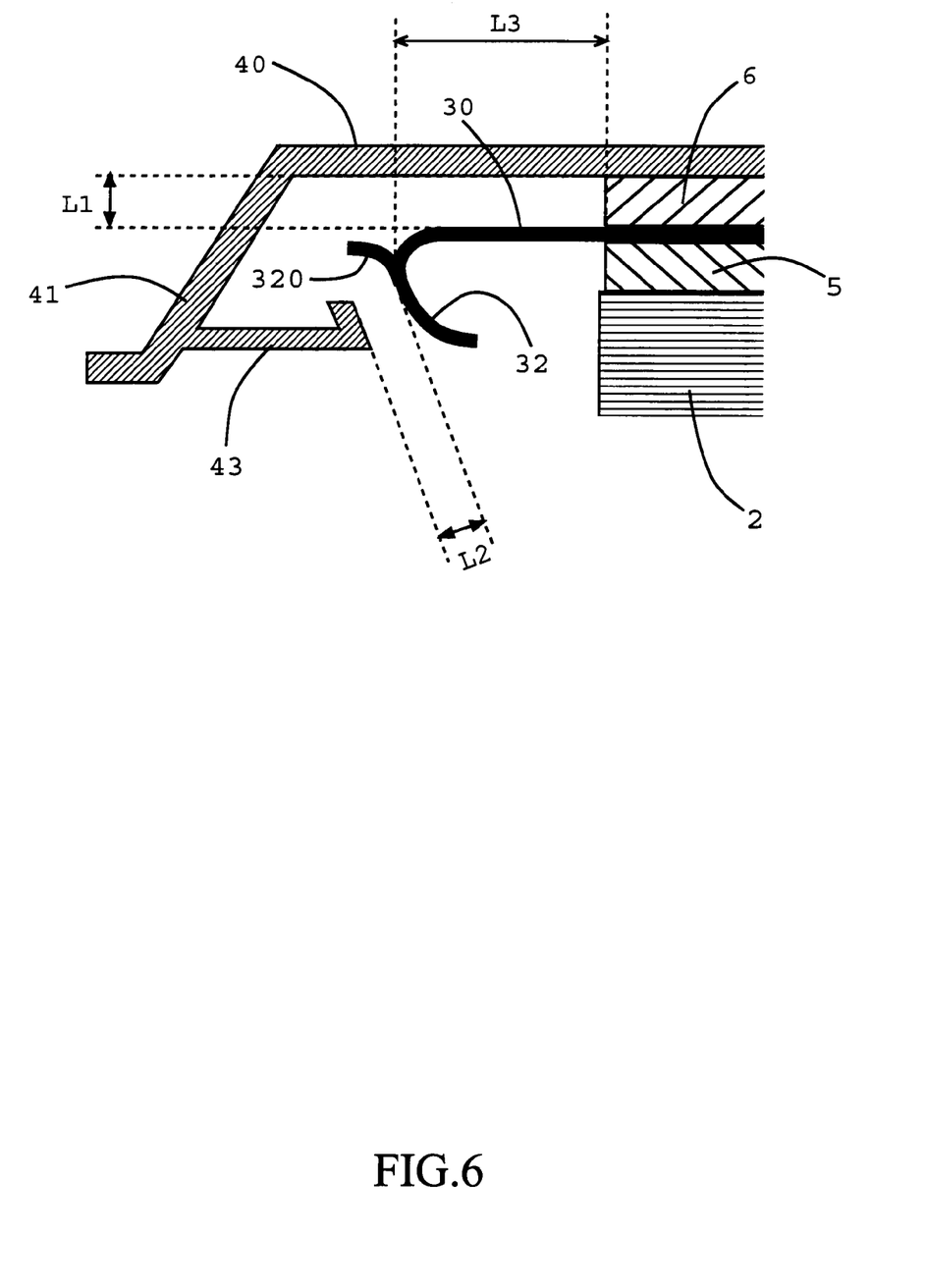
FIG. 6 is a view showing the shortest distances of an upstream side extension portion to other members.

Here, note that in this embodiment, there is no particular description about relative distances between individual members, etc., it is desirable to set the relative distances of each member to the others in such a manner that an electric discharge does not occur between the members. For example, as shown in FIG. 6, the shortest distance L1 between the inner peripheral surface of the case 4 and the upstream side extension portion 30 (the downstream side extension portion 31) is set to be equal to or larger than a spatial distance at which an electric discharge does not occur between the case 4 and the upstream side extension portion 30 (the downstream side extension portion 31). The shortest distance L2 between the protruding portion 32 and the restriction member 43 is set to be equal to or larger than a spatial distance at which an electric discharge does not occur between the protruding portion 32 and the restriction member 43. In addition, the length L3 of the upstream side extension portion 30 (the downstream side extension portion 31) is set in such a manner that a creeping distance extending from the upstream side end face (the downstream side end face) of the first mat member 6 to the upstream side end face (the downstream side end face) of the second mat member 5 through the outer peripheral surface of the upstream side extension portion 30 (the downstream side extension portion 31) and the inner peripheral surface of the upstream side extension portion 30 (the downstream side extension portion 31) is equal to or larger than a creeping distance at which a creeping discharge does not occur.

When the relative distances of each member to the others are set in this manner, it is also possible to prevent a short-circuit between the case and the heat generation element resulting from an electric discharge.

Figure 7:
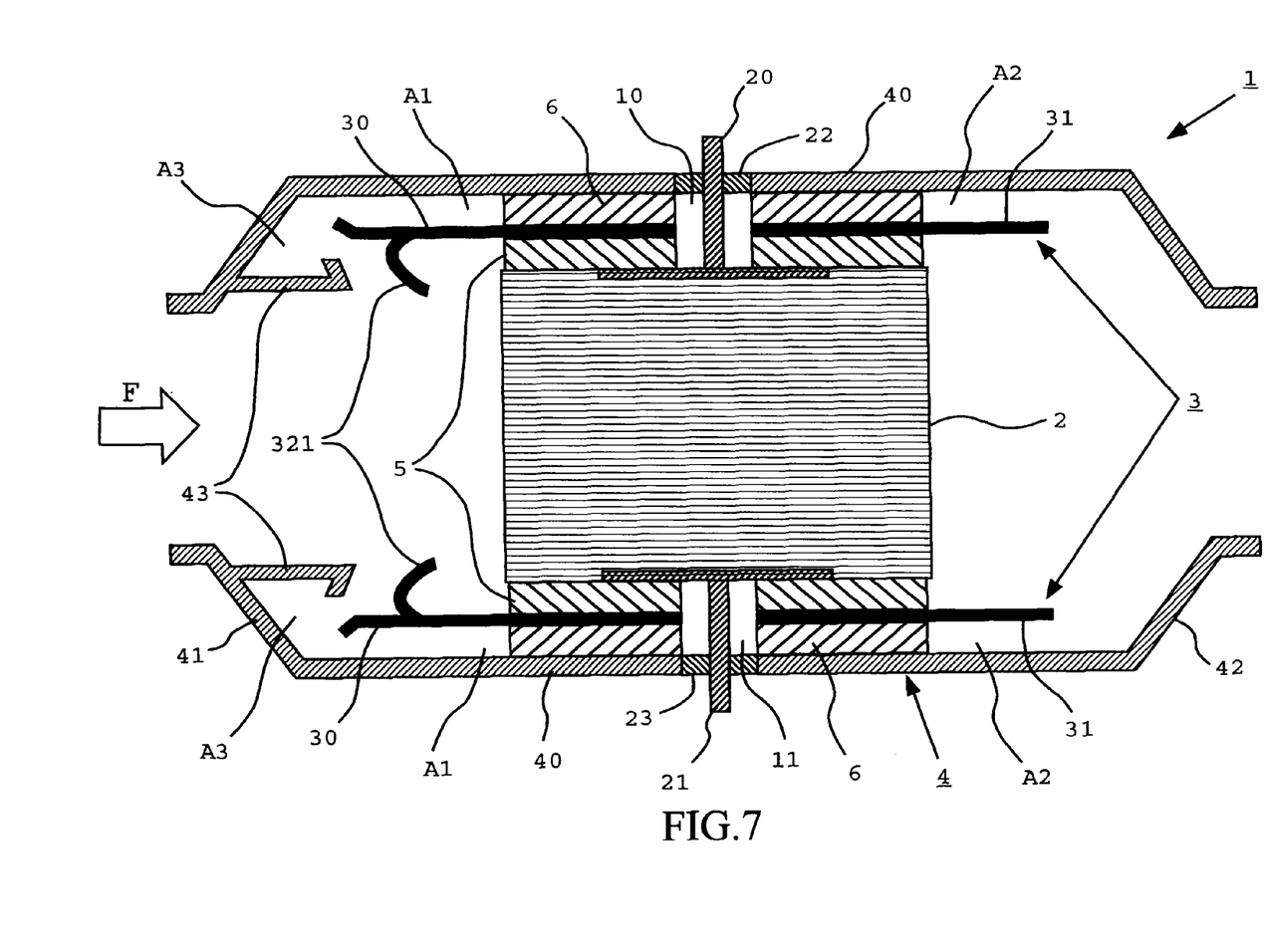
FIG. 7 is a view showing a construction example in which a protruding portion is formed on the middle of the upstream side extension portion.

In addition, in this embodiment, an example has been described in which the protruding portion is formed on the upstream side end portion of the upstream side extension portion 30, but it may be formed on the middle of the upstream side extension portion 30. For example, as shown in FIG. 7, a protruding portion 321 may be formed in such a manner that it protrudes from a location between the upstream side end portion and the downstream side end portion in the upstream side extension portion 30 to the diametrically inner side thereof. In that case, the protruding portion 321 may be formed so as to curve in a gentle or gradual manner, similar to the protruding portion 32 shown in FIG. 1. Moreover, the protruding portion 321 may also be formed in such a manner that a tip of the protruding portion 321 may be directed to the downstream side. According to such constructions, in comparison with the construction shown in FIG. 1, the contact area or contact time between the inner cylinder 3 and the exhaust gas decreases, but the amount of exhaust gas flowing into the upstream side gap A1 can be decreased.

Second Embodiment

Figure 9:
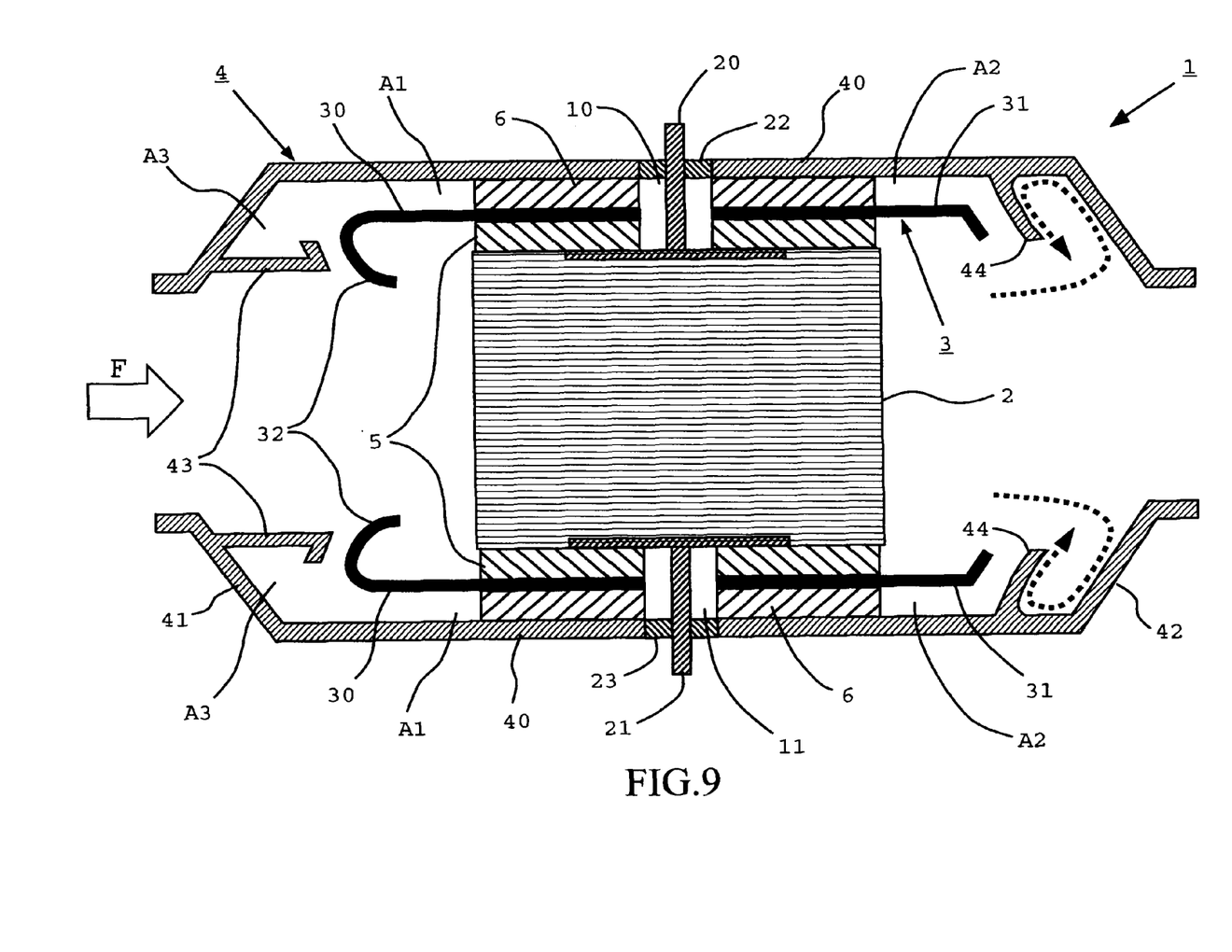
FIG. 9 is a view showing a flow of an exhaust gas which flows backwards or upstream after colliding with an inner wall surface of a downstream side conical portion.
Figure 10:
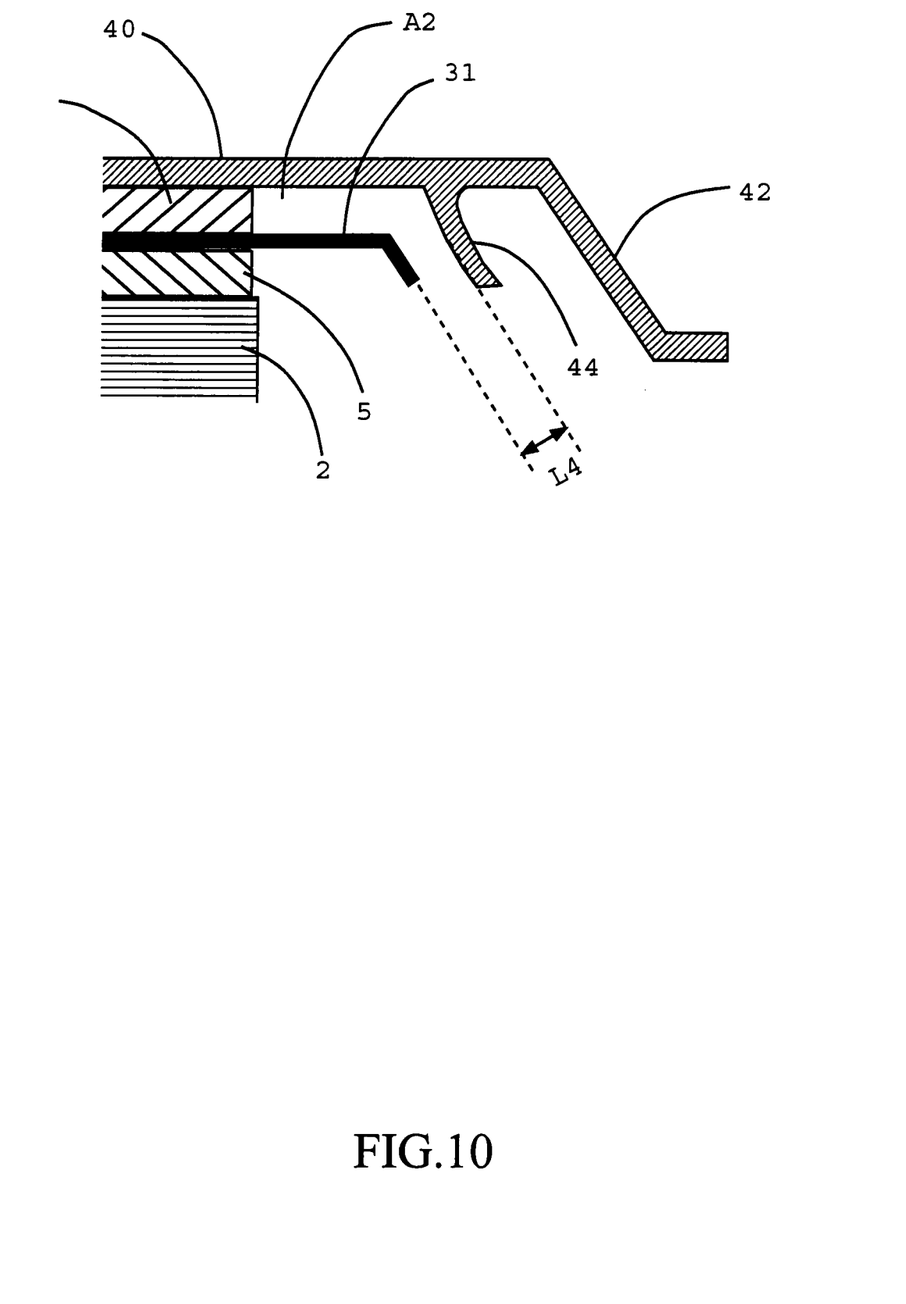
FIG. 10 is a view showing the shortest distances of a shield portion to other members.

Next, a second embodiment of an exhaust gas purification apparatus of an internal combustion engine according to the present invention will be described based on FIG. 8 through FIG. 10. Here, a construction different from that of the above-mentioned first embodiment will be described, and an explanation of the same construction will be omitted.

The difference between the above-mentioned first embodiment and this second embodiment is a point that a shield part 44 is formed on the inner peripheral surface of the case 4 at a location downstream of the downstream side end portion of the downstream side extension portion 31.

A portion of the exhaust gas, which has flowed out of the catalyst carrier 2 and flows through the vicinity of the periphery of the case 4, can flow backwards, after colliding with an inner wall surface of the downstream side conical portion 42. The exhaust gas flowing backwards in this manner can flow along the inner peripheral surface of the case 4 toward the upstream side thereof, so that it may flow into a space (downstream side gap) A2 which is surrounded by the outer peripheral surface of the downstream side extension portion 31, the inner peripheral surface of the case 4, and the downstream side end face of the first mat member 6.

Here, when a large amount of exhaust gas flows into the above-mentioned downstream side gap A2, the wall surfaces (the inner peripheral surface of the case 4, the downstream side end face of the first mat member 6, and the outer peripheral surface of the downstream side extension portion 31) surrounding this downstream side gap A2 may be covered with particulate matter. In that case, if the inner peripheral surface of the downstream side extension portion 31 and the downstream side end face of the second mat member 5 are covered with particulate matter, there will be a possibility that the case 4 and the catalyst carrier 2 may be short-circuited to each other through the particulate matter.

In addition, when a large amount of exhaust gas flows into the downstream side gap A2, the amount of heat released from the exhaust gas into the atmospheric air through the wall surface of the case 4 will increase. Therefore, in cases where an exhaust gas purification apparatus, which is different from the exhaust gas purification apparatus 1, is arranged in an exhaust passage at a location downstream of the exhaust gas purification apparatus 1, a drop in the temperature of the exhaust gas which flows into that exhaust gas purification apparatus will be caused.

Figure 8:
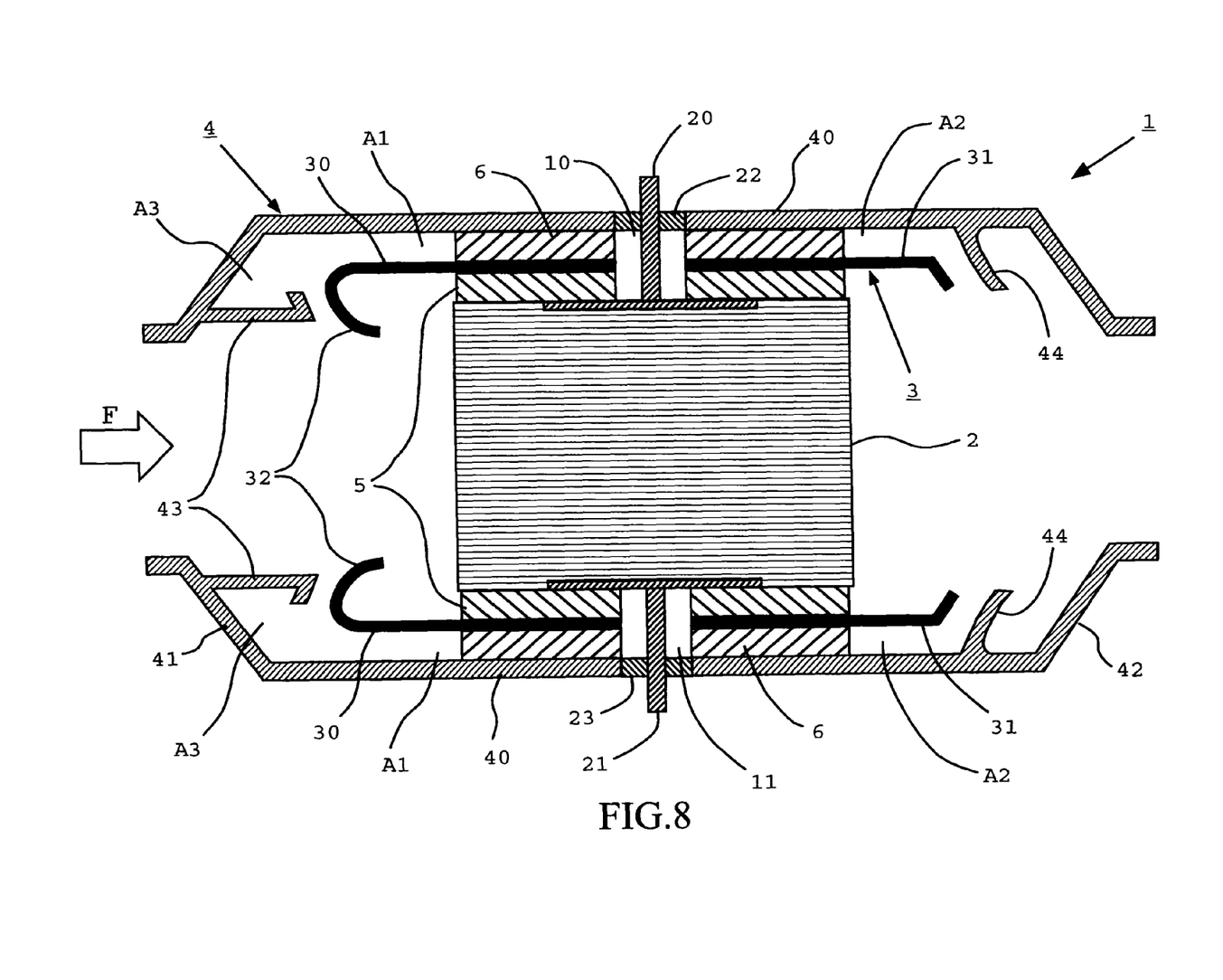
FIG. 8 is a view showing a vertical cross section of an exhaust gas purification apparatus in a second embodiment of the present invention.

In contrast to this, the exhaust gas purification apparatus 1 of this second embodiment is constructed such that, as shown in FIG. 8, on the inner peripheral surface of the case 4, there is formed the annular shield part 44 which protrudes diagonally from a location downstream of the downstream side end portion of the downstream side extension portion 31 to a diametrically inner side and a downstream side thereof. In an example shown in FIG. 8, the shield part 44 is formed on the cylindrical portion 40 of the case 4, but it may also instead be formed on the downstream side conical portion 42.

According to such a shield part 44, a flow of the exhaust gas flowing backwards after colliding with the downstream side conical portion 42 will be obstructed by the shield part 44. Here, note that a surface of the case 4 extending from the inner peripheral surface thereof to the shield part 44 may be formed by a gradually curved surface. In that case, the exhaust gas flowing backwards from the downstream side conical portion 42 swirls along a wall surface of the shield part 44 from the inner peripheral surface of the case 4, as shown in FIG. 9. As a result, the exhaust gas flowing backwards after colliding with the downstream side conical portion 42 stops flowing into the above-mentioned downstream side gap A2. Therefore, it is possible to avoid a situation where the wall surfaces surrounding the downstream side gap A2 are covered with particulate matter.

Here, note that the shield part 44 and the downstream side extension portion 31 should be arranged in such a manner that an electric discharge may not occur between both of them. That is, as shown in FIG. 10, the shortest distance L4 between the shield part 44 and the downstream side extension portion 31 should be decided such that it is equal to or larger than a spatial distance at which an electric discharge does not occur between both of them.

DESCRIPTION OF THE REFERENCE NUMERALS AND SYMBOLS 1 exhaust gas purification apparatus
2 catalyst carrier
3 inner cylinder
4 case
5 second mat member
6 first mat member
30 upstream side extension portion
31 downstream side extension portion 32 protruding portion
40 cylindrical portion
41 upstream side conical portion
42 downstream side conical portion
43 restriction member
44 shield part
320 auxiliary protruding portion
321 protruding portion

The invention claimed is:

1. An exhaust gas purification apparatus of an internal combustion engine comprising:
 a heat generation element that is electrically energized to generate heat;
 a case that is a cylindrical member having an inside diameter larger than an outside diameter of said heat generation element, and covers said heat generation element;
 an inner cylinder that is a cylindrical insulating body having an inside diameter larger than the outside diameter of said heat generation element and at the same time an outside diameter smaller than the inside diameter of said case, and is arranged between said heat generation element and said case;
 a first holding member that is a cylindrical insulating body arranged between said case and said inner cylinder, and holds said inner cylinder;
 a second holding member that is a cylindrical insulating body arranged between said heat generation element and said inner cylinder, and holds said heat generation element;
 an extension portion that is formed by extending an upstream side end portion of said inner cylinder to a more upstream side than an upstream side end face of said first holding member and an upstream side end face of said second holding member; and
 a protruding portion that is formed on said extension portion and protrudes to a diametrically inner side of said inner cylinder.

2. The exhaust gas purification apparatus of an internal combustion engine according to claim 1, wherein said protruding portion is formed by bending the upstream side end portion of said extension portion to the diametrically inner side.

3. The exhaust gas purification apparatus of an internal combustion engine according to claim 2, wherein said protruding portion curves in such a manner that a tip of said protruding portion is directed to a downstream side.

4. The exhaust gas purification apparatus of an internal combustion engine according to claim 3, wherein said protruding portion has a curvature, the magnitude of which is set in such a manner that the exhaust gas flowing backwards along an inner wall surface of said extension portion swirls in a forward direction along an inner wall surface of said protruding portion.

5. The exhaust gas purification apparatus of an internal combustion engine according to claim 1, wherein
 said case is provided with a cylindrical portion, and a conical portion of a tapered shape that is connected with an upstream side end portion and a downstream side end portion of said cylindrical portion; and
 on an inner wall surface of said conical portion connected with an upstream side of said cylindrical portion, there is formed a restriction member that is an annular body protruding to a downstream side and has an inside diameter equal to or less than that of said inner cylinder.

6. The exhaust gas purification apparatus of an internal combustion engine according to claim 5, wherein the shortest distance between said restriction member and said extension portion is set to be equal to or larger than a spatial distance at which an electric discharge does not occur between said restriction member and said extension portion.

7. The exhaust gas purification apparatus of an internal combustion engine according to claim 5, further comprising:
 a shield part that is formed on the inner peripheral surface of said cylindrical portion at a location downstream of the downstream side end portion of said inner cylinder, and protrudes to a diametrically inner side of said cylindrical portion.

8. The exhaust gas purification apparatus of an internal combustion engine according to claim 7, wherein the shortest distance between said shield part and said inner cylinder is set to be equal to or larger than a spatial distance at which an electric discharge does not occur between said shield part and said inner cylinder.

9. The exhaust gas purification apparatus of an internal combustion engine according to claim 1, wherein the shortest distance between said extension portion and said case is set to be equal to or larger than a spatial distance at which an electric discharge does not occur between said extension portion and said case.

10. The exhaust gas purification apparatus of an internal combustion engine according to claim 1, wherein a creeping distance of said extension portion extending from the upstream side end face of said first holding member to the upstream side end face of said second holding member is set to be equal to or larger than a distance at which a creeping discharge does not occur between said first holding member and said second holding member.

11. The exhaust gas purification apparatus of an internal combustion engine according to claim 4, wherein
 said case is provided with a cylindrical portion, and a conical portion of a tapered shape that is connected with an upstream side end portion and a downstream side end portion of said cylindrical portion; and
 on an inner wall surface of said conical portion connected with an upstream side of said cylindrical portion, there is formed a restriction member that is an annular body protruding to a downstream side and has an inside diameter equal to or less than that of said inner cylinder.

12. The exhaust gas purification apparatus of an internal combustion engine according to claim 11, wherein the shortest distance between said restriction member and said extension portion is set to be equal to or larger than a spatial distance at which an electric discharge does not occur between said restriction member and said extension portion.

13. The exhaust gas purification apparatus of an internal combustion engine according to claim 11, further comprising:
 a shield part that is formed on the inner peripheral surface of said cylindrical portion at a location downstream of the downstream side end portion of said inner cylinder, and protrudes to a diametrically inner side of said cylindrical portion.

14. The exhaust gas purification apparatus of an internal combustion engine according to claim 6, further comprising:
 a shield part that is formed on the inner peripheral surface of said cylindrical portion at a location downstream of the downstream side end portion of said inner cylinder, and protrudes to a diametrically inner side of said cylindrical portion.

15. The exhaust gas purification apparatus of an internal combustion engine according to claim 12, further comprising:
 a shield part that is formed on the inner peripheral surface of said cylindrical portion at a location downstream of the downstream side end portion of said inner cylinder, and protrudes to a diametrically inner side of said cylindrical portion.

16. The exhaust gas purification apparatus of an internal combustion engine according to claim 13, wherein the shortest distance between said shield part and said inner cylinder is set to be equal to or larger than a spatial distance at which an electric discharge does not occur between said shield part and said inner cylinder.

17. The exhaust gas purification apparatus of an internal combustion engine according to claim 15, wherein the shortest distance between said shield part and said inner cylinder is set to be equal to or larger than a spatial distance at which an electric discharge does not occur between said shield part and said inner cylinder.

18. The exhaust gas purification apparatus of an internal combustion engine according to claim 17, wherein the shortest distance between said extension portion and said case is set to be equal to or larger than a spatial distance at which an electric discharge does not occur between said extension portion and said case.

19. The exhaust gas purification apparatus of an internal combustion engine according to claim 18, wherein a creeping distance of said extension portion extending from the upstream side end face of said first holding member to the upstream side end face of said second holding member is set to be equal to or larger than a distance at which a creeping discharge does not occur between said first holding member and said second holding member.

* * * * *